United States Patent
Testa et al.

(10) Patent No.: US 11,128,938 B2
(45) Date of Patent: Sep. 21, 2021

(54) OPTICAL FILTERING MODULE AND METHOD

(71) Applicant: Telefonaktiebolaget LM Ericsson (publ), Stockholm (SE)

(72) Inventors: Francesco Testa, Pisa (IT); Fabio Cavaliere, Pisa (IT); Erin Seder, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/976,101

(22) PCT Filed: May 18, 2018

(86) PCT No.: PCT/EP2018/063192
§ 371 (c)(1),
(2) Date: Aug. 27, 2020

(87) PCT Pub. No.: WO2019/219215
PCT Pub. Date: Nov. 21, 2019

(65) Prior Publication Data
US 2020/0413167 A1 Dec. 31, 2020

(51) Int. Cl.
*H04Q 11/00* (2006.01)
*G02B 6/293* (2006.01)
(Continued)

(52) U.S. Cl.
CPC ..... *H04Q 11/0005* (2013.01); *G02B 6/29343* (2013.01); *G02B 6/4215* (2013.01);
(Continued)

(58) Field of Classification Search
CPC ........ H04Q 11/0005; H04Q 2011/0011; H04Q 2011/0013; H04Q 2011/0015;
(Continued)

(56) References Cited

U.S. PATENT DOCUMENTS 6,606,427 B1 * 8/2003 Graves ................ G02B 6/3849
385/17
7,635,836 B2 * 12/2009 Zheng ...................... G01J 1/44
250/208.2
(Continued)

FOREIGN PATENT DOCUMENTS

WO 0178281 A2 10/2001
WO 2016192617 A1 12/2016

OTHER PUBLICATIONS

PCT International Search Report and Written Opinion dated May 18, 2018 for International Application PCT/EP2018/063192, 11 pages.
(Continued)

*Primary Examiner* — Dalzid E Singh
(74) *Attorney, Agent, or Firm* — Sage Patent Group

(57) ABSTRACT

A method (100) is disclosed for filtering an optical signal to generate at least one electrical output. The method comprises receiving an optical signal (110) and directing at least a part of the optical signal through an n×m array of wavelength selective elements (120), the n×m array comprising n parallel groups, each group comprising m coupled wavelength selective elements. The method further comprises photodetecting an output from each of the n groups of coupled wavelength selective elements (130), and electrically selecting at least one of the photodetected outputs (140). Also disclosed are an optical filtering module (200, 300) a controller (400) for an optical filtering module and a computer program.

20 Claims, 5 Drawing Sheets

(51) Int. Cl.
  *G02B 6/42* (2006.01)
  *H04B 10/69* (2013.01)
  *H04J 14/02* (2006.01)
(52) U.S. Cl.
  CPC ........ *H04B 10/691* (2013.01); *H04J 14/0212* (2013.01); *H04Q 2011/0011* (2013.01); *H04Q 2011/0013* (2013.01); *H04Q 2011/0015* (2013.01); *H04Q 2011/0016* (2013.01); *H04Q 2011/0039* (2013.01)
(58) Field of Classification Search
  CPC .... H04Q 2011/0016; H04Q 2011/0039; G02B 6/29343; G02B 6/4215; H04B 10/691; H04J 14/0212
  USPC .......................................................... 398/48
  See application file for complete search history.

(56) References Cited

U.S. PATENT DOCUMENTS

| | | | |
|---|---|---|---|
| 7,792,396 B2* | 9/2010 | Kish, Jr. | H04J 14/0258 385/14 |
| 9,261,634 B2 | 2/2016 | Hendrix et al. | |
| 2012/0318966 A1 | 12/2012 | Jensen et al. | |
| 2014/0255022 A1* | 9/2014 | Zhong | H04Q 11/0062 398/16 |
| 2015/0168803 A1* | 6/2015 | Xu | G02F 1/353 359/332 |
| 2015/0358109 A1* | 12/2015 | D'Errico | H04Q 11/0005 398/19 |
| 2019/0235172 A1* | 8/2019 | Tu | H04J 14/0227 |
| 2019/0331912 A1* | 10/2019 | Tait | G02B 27/0012 |

OTHER PUBLICATIONS

Xiao, Shijun et al., "Multiple-Channel Silicon Micro-Resonator Based Filters for WDM Applications", Birck Nanotechnology Center, Purdue University, vol. 15, No. 12, Jun. 11, 2007, pp. 7489-7498, Optics Express.
DiCon Fiberoptics, "MEMS Network Tunable Filter (100GHz)", 2 pages.
Micron Optics, "Fiber Fabry-Perot Tunable Filter | FFP-TF", 2 pages.
Optoplex Corporation, "Tunable Optical Filter", 2 pages.
Sorianello, V. et al., "Experimental Evaluation of Residual Added Signal Crosstalk in a Silicon Photonics Integrated ROADM", Optical Society of America, 2014, 3 pages.
Santec, "Optical Tunable Filter OTF-320", Santec Optical Components, Thin-Film Filter Based Tunable Filter Module, 2 pages.
Wang, Xiaoxi et al., "Silicon Photonic Add-Drop Microring Filter Banks with Pinch-Resistor Characteristics", University of California, San Diego, Electrical & Computer Engineering, 2017, 2 pages.

* cited by examiner

OPTICAL FILTERING MODULE AND METHOD

CROSS-REFERENCE TO RELATED APPLICATIONS

This application is a 35 U.S.C. § 371 national stage application for International Application No. PCT/EP2018/063192, entitled "OPTICAL FILTERING MODULE AND METHOD", filed on May 18, 2018, the disclosures and contents of which are hereby incorporated by reference in their entireties.

TECHNICAL FIELD

The present disclosure relates to a method and an optical filtering module for filtering an optical signal to generate at least one electrical output. The present disclosure also relates to a controller for controlling an optical filtering module and a computer program product configured to carry out a method for filtering an optical signal to generate at least one electrical output.

BACKGROUND

The continuing evolution of mobile communication networks, and the implementation of 5G, will lead to a significant densification of the mobile access network, and consequently of the optical links used for backhauling monolithic radio base stations and for fronthauling split radio base stations. In order to save the cost of deploying new fiber cables, it is desirable to reuse installed network infrastructure, for example Passive Optical Networks (PON), for mobile backhaul and fronthaul purposes. Such an arrangement is referred to in the following disclosure as "5G access". Network function virtualisation and the deployment of cloud based services associated with 5G will also lead to increasing demands for data center capacity. Solutions for providing such capacity may also involve the deployment or reuse of optical network infrastructure.

Commercially available optical filtering systems, such as might be considered for 5G access or data center applications, all carry inherent cost, footprint, and technological limitations. For example, solutions implementing Micro-ElectroMechanical Systems (MEMS) technology are expensive, owing to their complex mechanical structures based on free space optics and 3-dimensional movements of micro-mirrors. Cost is important for use in 5G access network or data center applications. High cost is also associated with solutions in which the filtering function is based on thin-film technology. In addition, such solutions involve free space optics structures that suffer from large form-factors and low tuning response times, in the order of milliseconds. Another category of commercially available solutions uses Fabry-Perot cavities, and consequently is unable to provide the wide bandwidth and narrow channel spacing signal selection required by evolving 5G access networks and data centers.

In contrast to the commercially available solutions discussed above, photonic integrated devices are capable of offering the low cost, high capacity, miniaturization, and low power consumption that are required to support new applications in 5G transport, access networks and data centers. Silicon photonics is a promising technology for large-scale integrated filtering devices, owing to its characteristics of easy integration with control electronics, high miniaturization, mass reproducibility and high yield. Silicon photonics also offers low cost, as the well-established Complementary Metal-Oxide-Semiconductor (CMOS) production infrastructure may be used for fabrication. Silicon photonics thus offers the possibility for implementation of large-scale integration chips including thousands of optical and opto-electrical circuits with many different functionalities. Provision of such functionalities using currently available commercial solutions would require the implementation of several cards of a telecommunications equipment.

Micro-ring based silicon photonics is emerging as a preferred option to support reconfigurable selection and switching of high-speed Wavelength Division Multiplexing (WDM) signals. Micro-ring based silicon photonics allows for an integrated optical switching and filtering system, and coupling of multiple micro-ring resonators in a single switching or filtering element further enhances their ability to select the narrowly spaced optical channels present in Dense WDM (DWDM) comb filters. Several non-commercial optical filtering solutions have been proposed based on silicon photonic technologies, including micro-ring resonators. An example is the Reconfigurable Optical Add-Drop Multiplexer (ROADM) disclosed in V. Sorianello, F. Testa, P. Velha, S. Doneda, and M. Romagnoli, "Experimental evaluation of Residual Added Signal Crosstalk in a silicon photonics integrated ROADM," Optical Fiber Communication Conference, OSA Technical Digest (online) (Optical Society of America, 2014), paper Th2A.30. Despite the potential offered by silicon photonic technologies, the optical filtering solutions so far proposed, including the ROADM in the above referenced disclosure, all suffer from severe limitations from the point of view of 5G access or data center applications. Such limitations include strong polarization sensitivity, bandwidth restrictions, and high losses.

SUMMARY

It is an aim of the present disclosure to provide a method and apparatus which obviate or reduce at least one or more of the disadvantages mentioned above.

According to a first aspect of the present disclosure, there is provided a method for filtering an optical signal to generate at least one electrical output. The method comprises receiving an optical signal and directing at least a part of the optical signal through an n×m array of wavelength selective elements, the n×m array comprising n parallel groups and each group comprising m coupled wavelength selective elements. The method further comprises photodetecting an output from each of the n groups of coupled wavelength selective elements and electrically selecting at least one of the photodetected outputs.

According to examples of the present disclosure, the values of n and m may be greater than 1, such that the n×m array of wavelength selective elements comprises a plurality of parallel groups, each group comprising a plurality of wavelength selective elements.

According to examples of the present disclosure, the method may comprise electrically selecting up to n photodetected outputs.

According to examples of the present disclosure, at least some of the wavelength selective elements may be configurable to select a channel of a specific wavelength from within a selection range. According to such examples, the method may further comprise configuring the selection wavelength of at least some of the wavelength selective elements.

According to examples of the present disclosure, the received optical signal may be a DWDM signal, and the values of n and m may be selected according to a particular implementation. In some examples, for a received DWDM optical signal, n may be selected according to a width of the region occupied by the DWDM comb and a maximum tuning range of the wavelength selective elements, and m may be selected according to the channel spacing and data rate of the signal.

According to examples of the present disclosure, the wavelength selective elements may comprise Micro Ring Resonators (MRRs).

According to examples of the present disclosure, receiving an optical signal may comprise receiving an optical signal via a fiber coupler. Examples of fiber couplers may include an Edge Coupler or a Grating Coupler.

According to examples of the present disclosure, the method may further comprise amplifying, in the optical domain, the received optical signal before directing at least a part of the optical signal through the array of wavelength selective elements.

According to examples of the present disclosure, amplifying the received optical signal may comprise directing the received optical signal through a Semiconductor Optical Amplifier (SOA).

According to examples of the present disclosure, photodetecting outputs from the array of wavelength selective elements may comprise photodetecting using a semiconductor photodetector, such as for example a Germanium-on-Silicon photodetector.

According to examples of the present disclosure, the method may further comprise electrically amplifying the photodetected outputs from the array of wavelength selective elements before electrically selecting at least one of the photodetected outputs.

According to examples of the present disclosure, the method may further comprise splitting the received optical signal into at least two component signals having orthogonal polarisation states. According to such examples, directing at least a part of the optical signal through an array of wavelength selective elements may comprise directing a first of the component signals through a first n×m array of wavelength selective elements and directing a second of the component signals through a second n×m array of wavelength selective elements, each of the first and second n×m arrays comprising n parallel groups, each group comprising m coupled wavelength selective elements.

According to examples of the present disclosure, the first and second n×m arrays of wavelength selective elements may comprise at least one group pair, wherein a group pair comprises a group of coupled wavelength selective elements in the first array and a group of coupled wavelength selective elements in the second array which are configured to select the same channel wavelength. According to such examples, photodetecting outputs from the array of wavelength selective elements may comprise, for each group pair, converting the optical output of the coupled wavelength selective elements in the group belonging to the first array and the optical output of the coupled wavelength selective elements in the group belonging to the second array into a single photocurrent.

According to examples of the present disclosure, the first and second n×m arrays may comprise n group pairs, such that each of the n parallel groups of coupled wavelength selective elements in the first array is configured to select a channel of the same wavelength as one of the n parallel groups of coupled wavelength selective elements in the second array.

According to examples of the present disclosure, converting the optical output of the m coupled wavelength selective elements in the group belonging to the first array and the optical output of the m coupled wavelength selective elements in the group belonging to the second array into a single photocurrent may comprise inputting the two optical outputs to a single photodetecting element.

According to examples of the present disclosure, the method may further comprise optically amplifying each of the component signals before directing the components signals through the appropriate n×m array of wavelength selective elements.

According to examples of the present disclosure, the method may further comprise rotating at least one of the component signals such that the component signal is adapted to a propagation mode of a waveguide connecting the array of wavelength selective elements through which the component signal is to be directed.

According to examples of the present disclosure, the method may further comprise performing the steps of the method in a single module.

According to examples of the present disclosure, the module may comprise a signal chip module or a multi-chip module, according to different integration options. According to examples of the present disclosure, in a multi-chip module, the steps of receiving an optical signal, directing at least part of the signal through an array of wavelength selective elements and photodetecting outputs of the array may be performed on a single chip, with the step of electrically selecting at least one output from the photodetection performed on a separate chip, which may be integrated via 2.5D or 3D integration. The step of electrical amplification, if performed, may also be performed on the separate chip, together with the electrical selection.

According to another aspect of the present disclosure, there is provided a computer program comprising instructions which, when executed on at least one processor, cause the at least one processor to carry out a method according to any one of the preceding aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

According to another aspect of the present disclosure, there is provided an optical filtering module for receiving an optical signal and generating at least one electrical output. The optical filtering module comprises a coupler for receiving an optical signal and an n×m array of wavelength selective elements, the n×m array comprising n parallel groups, each group comprising m coupled wavelength selective elements. The optical filtering module further comprises a photodetector unit for photodetecting an output from each of the n groups of coupled wavelength selective elements, and an electrical switch for electrically selecting at least one output of the photodetector unit.

According to examples of the present disclosure, the values of n and m may be greater than 1, such that the n×m array of wavelength selective elements comprises a plurality of parallel groups, each group comprising a plurality of wavelength selective elements.

According to examples of the present disclosure, the coupler may comprise an Edge Coupler or a Grating Coupler. According to examples of the present disclosure, the electrical switch may be an n×1 up to an n×n electrical switch.

According to examples of the present disclosure, at least some of the wavelength selective elements may be configurable to select a specific wavelength from within a selection range.

According to examples of the present disclosure, the received optical signal may be a DWDM signal, and the values of n and m may be selected according to a particular implementation. In some examples, for a received DWDM optical signal, n may be selected according to a width of the region occupied by the DWDM comb and a maximum tuning range of the wavelength selective elements, and m may be selected according to the channel spacing and data rate of the signal.

According to examples of the present disclosure, the photodetector unit may comprise n photodetecting elements, each photodetecting element arranged to photodetect an output from one of the n groups of wavelength selective elements.

According to examples of the present disclosure, the wavelength selective elements may comprise Micro Ring Resonators (MRRs).

According to examples of the present disclosure, the optical filtering module may further comprise an optical amplifier unit for amplifying the received optical signal.

According to examples of the present disclosure, the optical amplifier unit may comprise a SOA.

According to examples of the present disclosure, the photodetector unit may comprise at least one semiconductor photodetector, such as for example a Germanium-on-Silicon photodetector.

According to examples of the present disclosure, the optical filtering module may further comprise an electrical amplifier unit for amplifying the outputs from the photodetector unit.

According to examples of the present disclosure, the electrical amplifier unit may comprise at least n electrical amplifying elements, each electrical amplifying element arranged to amplify an output from a photodetecting element.

According to examples of the present disclosure, the optical filtering module may in some examples comprise n transimpedance amplifiers and n linear amplifiers, with a transimpedance amplifier and a linear amplifier arranged to amplify the output of each photodetecting element.

According to examples of the present disclosure, the optical filtering module may further comprise a polarisation splitter and rotator for splitting the received optical signal into at least two component signals having orthogonal polarisation states.

According to examples of the present disclosure, the n×m array of wavelength selective elements may comprise a first n×m array of wavelength selective elements and the optical filtering module may further comprise a second array of n×m wavelength selective elements, each of the first and second arrays comprising n parallel groups, each group comprising m coupled wavelength selective elements. According to such examples, the first array of wavelength selective elements may be arranged to receive a first component signal of the received optical signal and the second array of wavelength selective elements may be arranged to receive a second component signal of the received optical signal.

According to examples of the present disclosure, the first and second n×m arrays of wavelength selective elements may comprise at least one group pair, wherein a group pair comprises a group of coupled wavelength selective elements in the first array and a group of coupled wavelength selective elements in the second array which are configured to select the same channel wavelength. According to such examples, the photodetector unit may comprise n photodetecting elements, each photodetecting element corresponding to a group pair and arranged to convert the optical outputs of the two groups of coupled wavelength selective elements forming the group pair into a single photocurrent.

According to examples of the present disclosure, the first and second n×m arrays may comprise n group pairs, such that each of the n parallel groups of coupled wavelength selective elements in the first array is configured to select a channel of the same wavelength as one of the n parallel groups of coupled wavelength selective elements in the second array.

According to examples of the present disclosure, the optical amplifier unit may comprise a dedicated optical amplifying element for amplifying each of the component signals.

According to examples of the present disclosure, the polarisation splitter and rotator may be configured to rotate at least one of the component signals such that the component signal is adapted to a propagation mode of a waveguide connecting the array of wavelength selective elements arranged to receive the component signal.

According to examples of the present disclosure, at least a coupler for receiving the optical signal, the n×m array of wavelength selective elements, and the photodetector unit may be arranged on a single chip.

According to examples of the present disclosure, the optical filtering module may comprise a single chip module, and the electrical switch may also be integrated on the same chip as the other elements. According to further examples of the present disclosure, the optical filtering module may comprise a multi-chip module, and the electrical switch, and electrical amplifiers if present, may be arranged on a different chip to the other elements. The chips may be 2.5D or 3D integrated.

According to another aspect of the present disclosure, there is provided a controller for controlling an optical filtering module, the optical filtering module for receiving an optical signal and generating at least one electrical output. The optical filtering module comprises a coupler for receiving an optical signal and an n×m array of wavelength selective elements, the n×m array comprising n parallel groups, each group comprising m coupled wavelength selective elements. The optical filtering module further comprises a photodetector unit for photodetecting an output from each of the n groups of coupled wavelength selective elements, and an electrical switch for electrically selecting at least one output of the photodetector unit. The controller is operable to configure at least one of a selection wavelength of a wavelength selective element or the electrical switch.

According to examples of the present disclosure, the values of n and m may be greater than 1, such that the n×m array of wavelength selective elements comprises a plurality of parallel groups, each group comprising a plurality of wavelength selective elements.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Aspects of the present disclosure provide an optical filtering module and method which may be used both to select an optical channel and to convert the selected channel to an electrical output signal. The optical filtering module and method offer an integrated solution which may reduce cost when compared to commercially available filtering solutions, as well as addressing many of the limitations inherent in previously proposed silicon photonic filtering solutions.

Figure 1:
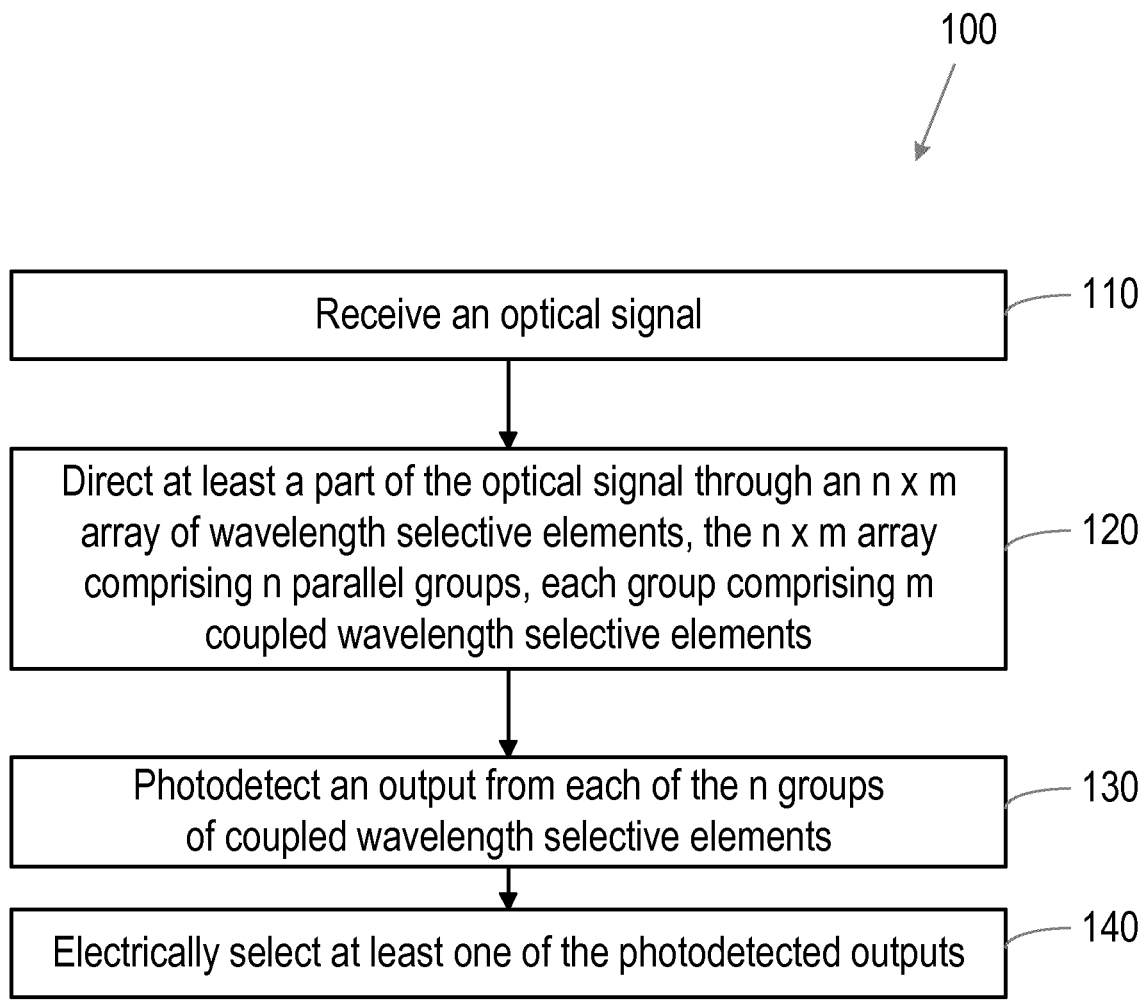
FIG. 1 is a flow chart illustrating process steps in a method for filtering an optical signal to generate at least one electrical output.

FIG. 1 is a flow chart illustrating process steps a first example of a method 100 for filtering an optical signal to generate at least one electrical output. The method may be carried out within an optical filtering module, as described in further detail below with reference to FIGS. 2 and 3. Referring to FIG. 1, in a first step 110, the method comprises receiving an optical signal, which may for example be a WDM or DWDM signal of generic bandwidth and channel spacing. The method then comprises, in step 120, directing at least a part of the optical signal through an n×m array of wavelength selective elements, the n×m array comprising n parallel groups, each group comprising m coupled wavelength selective elements. The method then comprises, in step 130, photodetecting an output from each of the n groups of coupled wavelength selective elements, and, in step 140, electrically selecting at least one of the photodetected outputs. According to examples of the present disclosure, the values of n and m may be greater than 1, such that the n×m array of wavelength selective elements comprises a plurality of parallel groups, each group comprising a plurality of wavelength selective elements.

The steps of the method 100 may be carried out in a single optical filtering module, which may comprise a single chip module or a multi-chip module according to different integration options. In a multi-chip module, the steps of receiving an optical signal, directing at least part of the signal through an array of wavelength selective elements, and photodetecting outputs of the array may be performed on a single chip, with the step of electrically selecting at least one output from the photodetection performed on a separate chip, which may be integrated via 2.5D or 3D integration.

Figure 2:
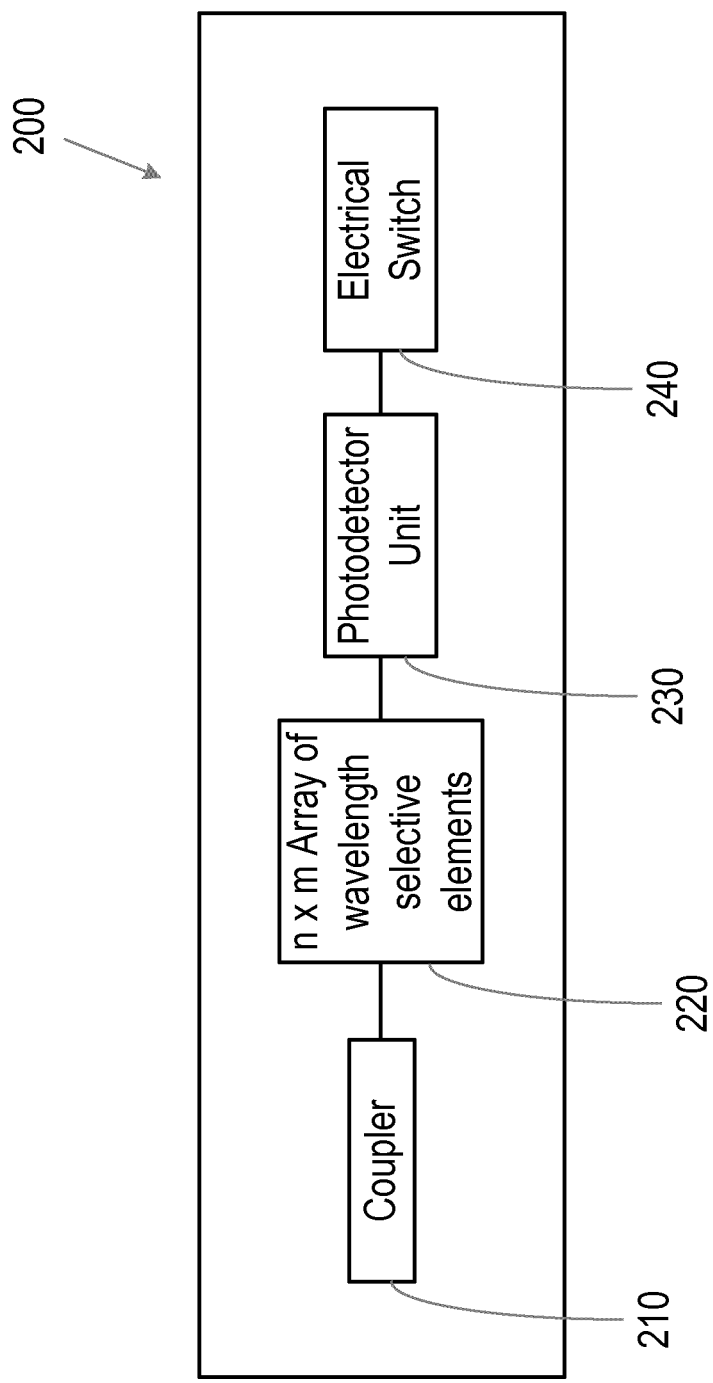
FIG. 2 is a block diagram illustrating functional units in an optical filtering module.

FIG. 2 is a block diagram illustrating functional units in an optical filtering module 200 which may in some examples conduct the method 100 described above. The optical filtering module may thus be for receiving an optical signal and generating at least one electrical output. Referring to FIG. 2, the optical filtering module 200 comprises a coupler 210 for receiving an optical signal and an n×m array of wavelength selective elements 220, the n×m array comprising n parallel groups, each group comprising m coupled wavelength selective elements. The values of n and m may be greater than 1, such that the n×m array of wavelength selective elements comprises a plurality of parallel groups, each group comprising a plurality of wavelength selective elements. At least some of the wavelength selective elements may be configurable to select a specific wavelength from within a selection range, and may comprise Micro Ring Resonators (MRRs). The optical filtering module further comprises a photodetector unit for photodetecting an output from each of the n groups of coupled wavelength selective elements, for example via n photodetecting elements. The photodetector unit may for example comprise at least one semiconductor photodetector such as a Germanium-on-Silicon photodetectors. The optical filtering module further comprises an electrical switch 240 for electrically selecting at least one output of the photodetector unit. The optical filtering module 200 may be a single chip or multi-chip optical filtering module. In examples comprising a multi-chip optical filtering module, the coupler 210, array of wavelength selective elements 220 and photodetector unit 230 may be arranged on a single chip, with the electrical switch arranged on a separate chip, which may be integrated via 2.5D or 3D integration.

Figure 3:
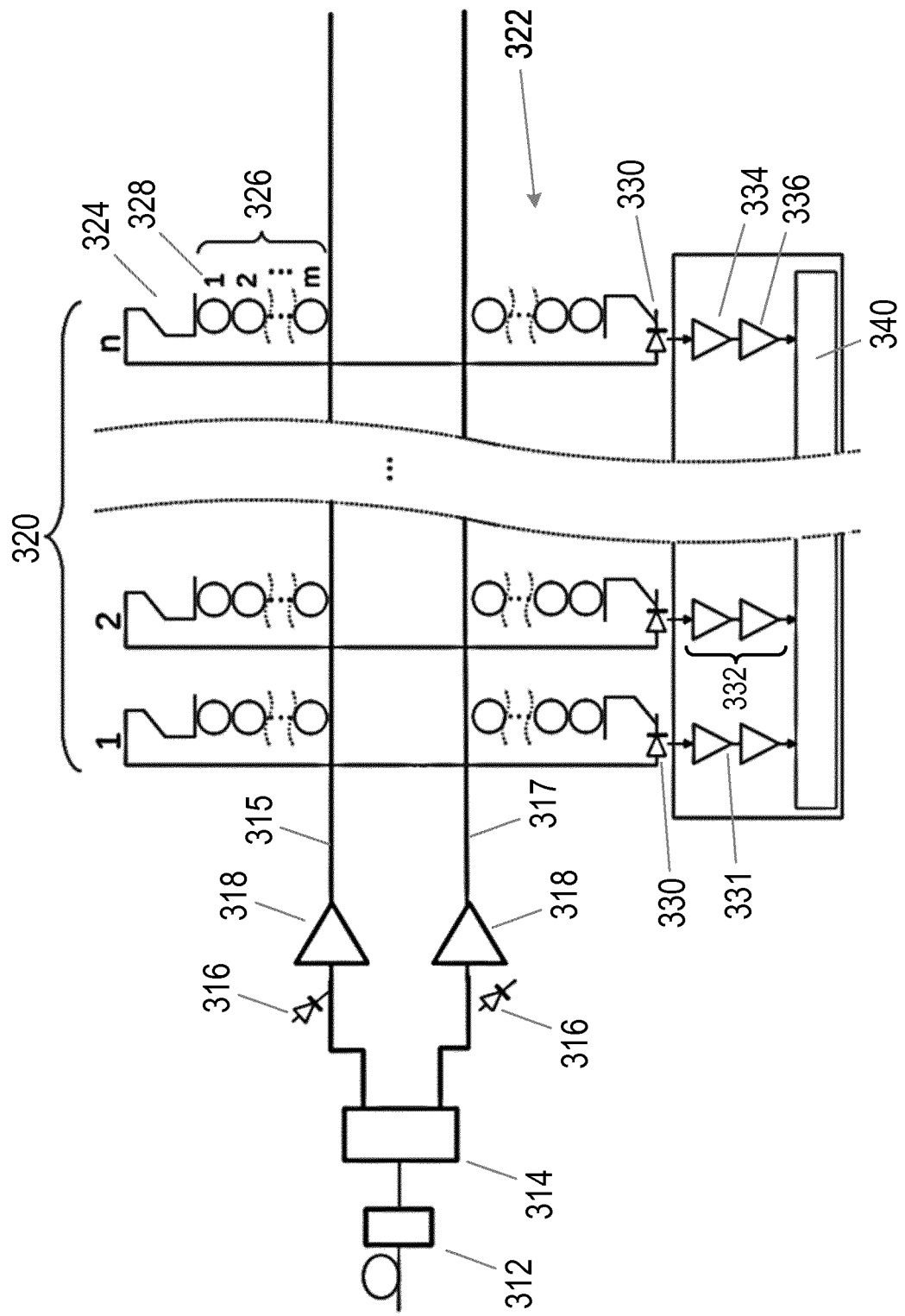
FIG. 3 is a block diagram illustrating functional units in another example of optical filtering module.

An example implementation of an optical filtering module 300 is illustrated in FIG. 3. The optical filtering module 300 illustrates one way in which the functional blocks of the optical filtering module 200 may be realised, as well as illustrating additional elements which may provide enhanced or additional functionality.

Referring to FIG. 3, the optical filtering module 300 comprises a coupler in the form of an Edge Coupler 312. Other examples of coupler, such as a Grating Coupler, may also be considered for the coupler via which the optical filtering module 300 receives an optical signal. The optical filtering module 300 may comprise a single coupler for receiving the optical signal. The optical filtering module 300 further comprises a polarisation splitter and rotator 314 for splitting the received optical signal into at least two component signals having orthogonal polarisation states, each component signal being forwarded onto a dedicated waveguide. Monitor photodiodes 316 are positioned on each of the parallel waveguides, and an optical amplifier unit comprising a pair of Semiconductor Optical Amplifiers (SOAs) 318 is arranged to amplify the component signals output from the polarisation splitter and rotator 314. The optical filtering module 300 further comprises two identical arrays of wavelength selective elements, the individual groups in each array being coupled via an optical bus 315, 317, and each array arranged to receive one of the component signals output from the polarisation splitter and rotator 314. In the illustrated optical filtering module 300, the wavelength selective elements comprise Micro Ring Resonators (MRRs) 328, which offer the advantage of being tuneable over a wide wavelength range, as discussed in further detail below.

However other examples of wavelength selective elements may be considered, including for example Bragg gratings or arrayed waveguide gratings, either of which may be used in conjunction with other types of switching elements (like MEMS), or other types of optical circuits. For example, in order to provide the wavelength range offered by MRRs, other types of wavelength selective elements may be combined with optical switches or variable optical attenuators (also realisable in Silicon photonics). In one example, a switch could be used to select a path containing a filter at the desired wavelength, or variable attenuators could be used to attenuate all the wavelength paths except the desired one. Such examples, while introducing additional complexity and losses when compared to the illustrated MRRs, nonetheless offer an alternative way of realising the wavelength selective elements of the optical filtering module of the present disclosure.

Referring still to FIG. 3, the MRRs 328 of the optical filtering module 300 are configured to selectively extract a specific optical channel or wavelength and redirect that optical channel or wavelength towards a drop port of the MRR, while allowing bypass of all other optical channels or wavelengths. Each MRR 328 may be set or tuned to act upon a particular optical wavelength from the combination of optical channels input along the optical bus 315, 317, and within a certain wavelength range of the MRR. In some examples of the optical filtering module 300, the wavelength ranges of different MRRs on a single array do not overlap. The tuning of individual MRRs may be achieved by heating each MRR to vary the refractive index associated with the material from which the MRR is made. In other examples, tuning may be accomplished by varying an electric field applied across the MRR, or by injecting carriers into the MRR.

Referring still to FIG. 3, each array 320, 322 of MRRs is an n×m array comprising n parallel groups 324, each group 324 comprising m coupled micro-ring resonators 326, where the values of n and m are greater than 1. Each of the n groups of m coupled MRRs in each array 320, 322 may be tuned within a particular sub-band of the input DWDM filter comb. The number, m, of coupled MMRs may therefore be defined by the channel spacing between the channels in the input DWDM filter comb and by the data rate of the channels. Thus for example a 25 Gbps NRZ-OOK signal with 0.8 nm channel spacing in a DWDM comb filter would require m=2 coupled MRRs. The number n of sub-bands, and hence of groups 324 of coupled MRRs, is defined by the width of the entire region occupied by the input DWDM comb filter and by the maximum tuning range of the MRRs. Thus for example an input signal of 1530 nm-1562 nm would require an array n=4 if the maximum MRR tuning range is 8 nm.

The optical filtering module 300 further comprises a photodetector unit comprising a plurality of photodetectors 330. Each photodetector 330 may be designed to receive optical power from two directions and to convert both into a single photocurrent. In one example, the photodetectors may be Germanium-on-Silicon photodetectors.

Near infrared photodetectors with high responsivity and high bandwidth have been investigated in depth over the last decade. Pure silicon photodetectors are less preferred for telecommunication applications, as silicon has a low absorption coefficient at telecommunication wavelengths (around 1310 nm and 1550 nm). As a result, germanium (Ge) has become a superior choice for detection. Ge has a smaller bandgap than silicon and demonstrates good absorption at telecommunication wavelengths. However, its absorption length at 1550 nm is long, so it is difficult to have high responsivity for a surface illuminated photodetector. To overcome this, waveguide based photodetectors are implemented with the waveguide length designed to optimise responsivity. Another advantage is that Ge is compatible with CMOS fabrication processes. Epitaxial growth of Ge on silicon-on-insulator substrates has to overcome a significant lattice mismatch between the two heterostructure materials, but this can be achieved by growing a thick SiGe buffer layer between the two materials to relieve the large lattice mismatch.

Referring again to FIG. 3, the optical filtering module 300 further comprises an electrical amplification stage 331 and an electrical switch 340. The electrical amplification stage comprises a pair 332 of electrical amplifies for amplifying the output of each photodetector 320. Each pair 332 comprises a transimpedance amplifier 334 and a linear amplifier 336. The electrical switch 340 comprises n inputs, corresponding to the n photodetected currents, and may have between 1 and n outputs.

FIG. 3 illustrates an example in which the optical filtering module comprises a single chip module, with all components of the optical filtering module 300 integrated on the same chip. In other examples (not shown), the optical filtering module 300 may comprise a multi-chip module, with for example the electrical amplifiers and electrical switch arranged on a separate chip to the other elements, the two chips being 2.5D or 3D integrated.

In use, an optical signal such as a DWDM signal may enter the optical filtering module 300 via a standard single mode optical fiber, which fiber is coupled to an optical waveguide of the optical filtering module 300 using the Edge Coupler 312. The input signal of generic polarisation state is then subdivided into two orthogonal components, a first, Transverse Electric (TE) component and a second Transverse Magnetic (TM) component, by the polarisation splitter and rotator 314. In addition, the polarisation splitter and rotator 314 adapts the component signals to a main propagation mode (either TE or TM) of the waveguide onto which it is to be forwarded by rotating one of the two components.

The two polarisation components are then amplified by the SOAs 318 and forwarded onto a respective MRR array 320, 322 via the optical buses 315, 317. Within each array 320, 322, the optical channels of a selected wavelength within a sub-band are dropped from the optical buses by the n-series of m-coupled MRRs. This is achieved by appropriate tuning of the individual MRRs as discussed above. The n groups of m coupled MRRs in each array may be tuned such that each of the n parallel groups of coupled wavelength selective elements in the first array 320 is configured to select a channel of the same wavelength as one of the n parallel groups of coupled wavelength selective elements in the second array 322. A group of coupled wavelength selective elements in the first array and a group of coupled wavelength selective elements in the second array which are configured to select the same channel wavelength are referred to in the following disclosure as a group pair.

Each array of MRRs outputs n optical signals, one from each of the n groups of m coupled MRRs. Each of the n signals output from the first array 320 is of the same channel wavelength as one of the n signals output from the second array 322, such that the two arrays together output n pairs of corresponding dropped signals. Each of the n pairs of dropped signals, each pair comprising one signal for each polarisation, is then forwarded through two parallel waveguides to a corresponding Ge photodetector 320, integrated with the waveguides, which converts the combination of both optical signals into a single photocurrent. Each of the n resulting electrical signals is then electrically amplified. The n amplified outputs are then selected by the electrical switch, which as discussed above may select between 1 and n electrical outputs and forward these outputs for further electrical processing.

It will be appreciated that the optical filtering module 300 offers two levels of dynamic reconfigurability, without the need for manual intervention. Firstly, a desired optical channel selection within each sub-band of the input signal may be accomplished by tuning of the individual MRRs. As discussed above, this may achieved by thermal or other regulation of the individual ring resonators, moving the resonance to correspond to the desired channel wavelength. Secondly, the electrical switch 340 may be configured to select any combination between 1 and n of the photodetected outputs, each of which may be directed for further electrical processing as appropriate.

Figure 4:
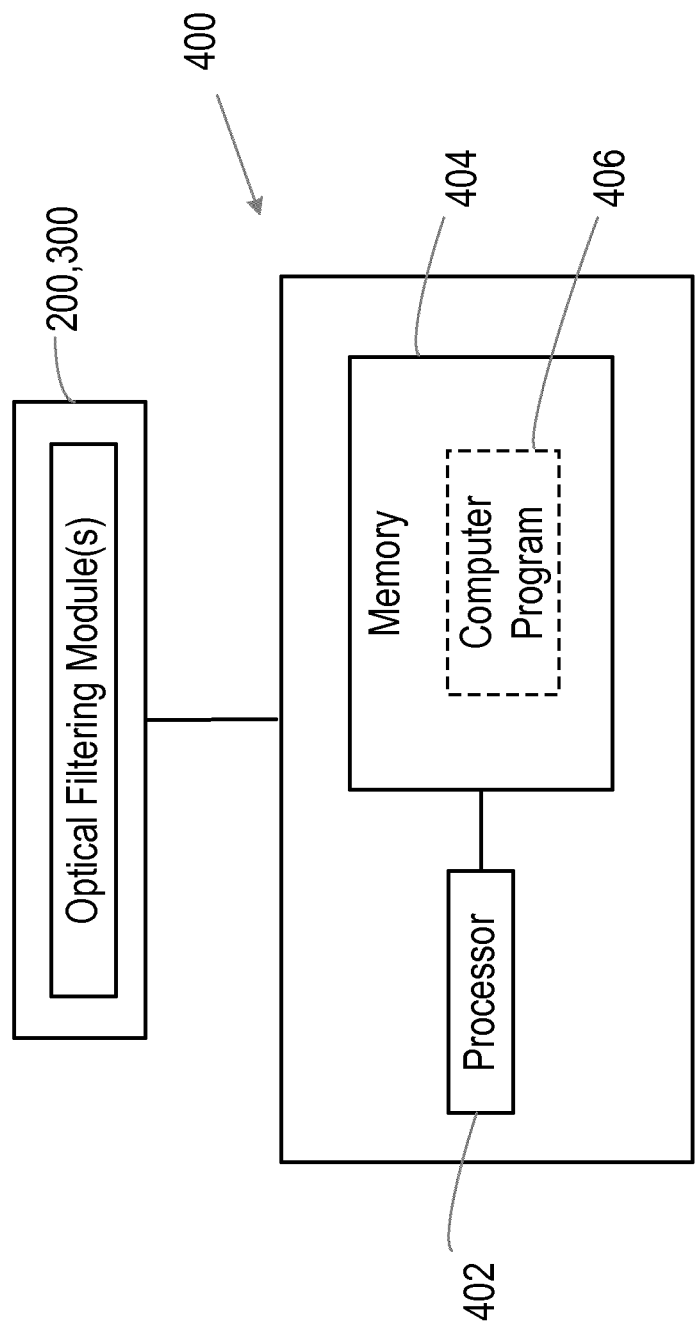
FIG. 4 is a block diagram illustrating functional units in a controller.

FIG. 4 is a block diagram illustrating functional units in a controller 400 for controlling an optical filtering module such as the optical filtering module 200 of FIG. 2 or optical filtering module 300 of FIG. 3. Referring to FIG. 4, the controller 400 comprises a processor 402 (alternatively referred to as processing circuitry), a memory 404 and may also comprise interfaces (not shown). The memory 404 contains instructions executable by the processor 402 such that the controller 400 is operative to conduct some or all of the steps of the method 100 described above or the method 500 described below. The instructions may be stored in the form of a computer program 406. In some examples, the controller may be arranged to configure at least one of a selection wavelength of a wavelength selective element in the optical filtering module 200, 300 or the electrical switch of the optical filtering module 200, 300. For example, the processor 402 may be implemented by any type of integrated circuit, e.g. ASIC or FPGA etc. The memory may be any suitable memory for the processor, e.g. RAM, ROM, solid state disk, hard disk drive etc.

Figure 5:
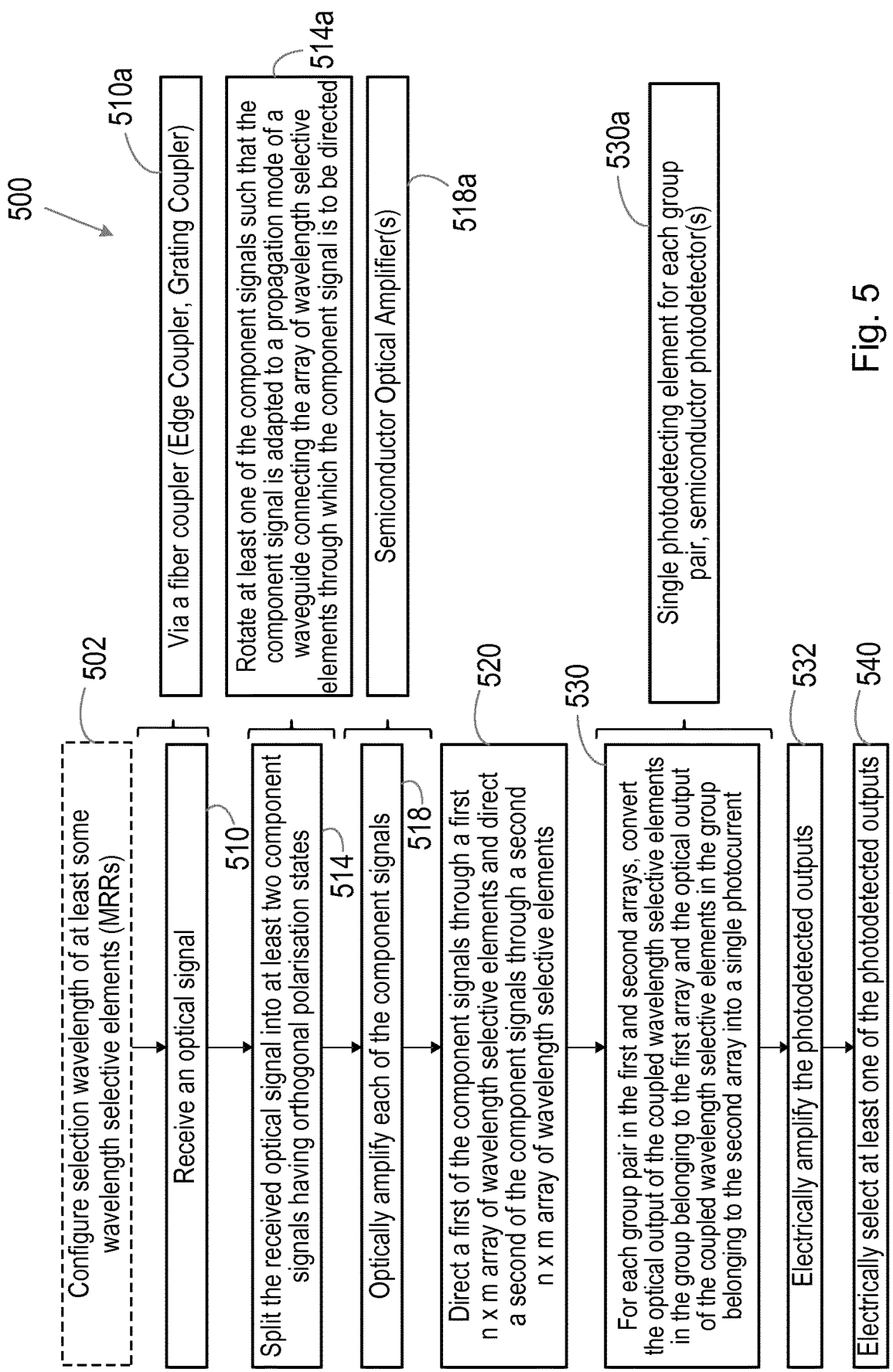
FIG. 5 is a flow chart illustrating process steps in another example of method for filtering an optical signal to generate at least one electrical output.

FIG. 5 is a flow chart illustrating process steps in another example of method for filtering an optical signal to generate at least one electrical output. The method 500 of FIG. 5 may for example be conducted by an optical filtering module such as the optical filtering module 300 of FIG. 3.

Referring to FIG. 5, before the remaining steps of the method 500 are carried out, an initial step 502 may conducted in which a selection wavelength of at least some of the wavelength selective elements of the optical filtering module and/or the electrical switch of the optical filtering module are configured. Step 502 may for example be conducted by a controller such as the controller 400 of FIG. 4.

In step 510, the method 500 comprises receiving an optical signal, for example via a fiber coupler such as an Edge Coupler or a Grating Coupler, as illustrated at step 510a. In step 514, the method comprises splitting the received optical signal into at least two component signals having orthogonal polarisation states. The method further comprises, at step 514a, rotating at least one of the component signals such that the component signal is adapted to a propagation mode of a waveguide connecting an array of wavelength selective elements through which the component signal is to be directed. In step 518, the method comprises optically amplifying the each of the component signals, for example by directing each of the component signals through a Semiconductor Optical Amplifier at step 518a.

In step 520, the method 500 comprises directing a first of the component signals through a first n×m array of wavelength selective elements and directing a second of the component signals through a second n×m array of wavelength selective elements, each of the first and second n×m arrays comprising n parallel groups, each group comprising m coupled wavelength selective elements. According to examples of the present disclosure, the values of n and m may be greater than 1, such that the n×m array of wavelength selective elements comprises a plurality of parallel groups, each group comprising a plurality of wavelength selective elements. As discussed above with respect to FIG. 3, the first and second n×m arrays of wavelength selective elements in the optical filtering module in which the method 500 is carried out may comprise at least one group pair, wherein a group pair comprises a group of coupled wavelength selective elements in the first array and a group of coupled wavelength selective elements in the second array which are configured to select the same channel wavelength. In the presently discussed example, the first and second n×m arrays comprise n group pairs, such that each of the n parallel groups of coupled wavelength selective elements in the first array is configured to select a channel of the same wavelength as one of the n parallel groups of coupled wavelength selective elements in the second array. In step 530, the method 500 comprises, for each group pair, converting the optical output of the coupled wavelength selective elements in the group belonging to the first array and the optical output of the coupled wavelength selective elements in the group belonging to the second array into a single photocurrent. As illustrated in step 530a, this comprises, for each group pair, inputting the two optical outputs to a single photodetecting element.

The method then comprises, at step 532, electrically amplifying the photodetected outputs and, at step 540, electrically selecting at least one of the photodetected outputs. As discussed above, the steps of the method 500 may be carried out in in a single optical filtering module. The optical filtering module may comprise a single chip module or a multi-chip module according to different integration options. In a multi-chip module, the steps of receiving an optical signal, directing at least part of the signal through an array of wavelength selective elements and photodetecting outputs of the array may be performed on a single chip, with the steps of amplifying and electrically selecting at least one output from the photodetection performed on a separate chip, integrated via 2.5D or 3D integration.

As illustrated by the above discussion, aspects of the present disclosure provide a fully integrated, reconfigurable optical filtering module and method, which may be used to both select and convert an optical channel, from within a DWDM comb of generic bandwidth and channel spacing, to an electrical signal output for processing. The integrated nature of the method and module proposed by examples of the present disclosure alleviates the need for multiple external cards, as well as additional high gain optical amplifiers that would be required if an output optical signal was coupled via optical fiber to an off-chip processing circuit. Examples of the present disclosure also allow for dynamic reconfigurability without the manual intervention required in some filter installations.

As discussed in the background section, there are many limitations on currently available optical switching and filtering systems. Examples of the present disclosure offer a considerable cost advantage over available commercial solutions, owing to their integrated nature and use of silicon photonics. This allows for high miniaturization, mass reproducibility, potential high yield, and the possibility of using the already well-established CMOS production infrastructure. In addition to these advantages, examples of the present disclosure also represent an improvement compared to non-commercially available solutions involving silicon photonics. These improvements include input-signal polarisation insensitivity, large bandwidth capacity, software controlled selectability, and drastically reduced fiber-coupling losses owing to the integration of optical detectors on chip.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

The method and apparatus described may be implemented in a ROADM, e.g. for selection and/or switching of optical signals. As such, any example may be considered as referring to a ROADM or a method of operation of a ROADM.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for filtering an optical signal to generate at least one electrical output, the method comprising:
   receiving an optical signal;
   directing at least a part of the optical signal through an n×m array of wavelength selective elements, the n×m array comprising n parallel groups, each group comprising m coupled wavelength selective elements;
   photodetecting an output from each of the n groups of coupled wavelength selective elements; and
   electrically selecting at least one of the photodetected outputs.

2. The method as claimed in claim 1, wherein at least some of the wavelength selective elements are configurable to select a channel of a specific wavelength from within a selection range, the method further comprising:
   configuring the selection wavelength of at least some of the wavelength selective elements, wherein the wavelength selective elements comprise Micro Ring Resonators (MRRs).

3. The method as claimed in claim 1, further comprising: amplifying the received optical signal before directing at least a part of the optical signal through the array of wavelength selective elements.

4. The method as claimed claim 1, further comprising: electrically amplifying the photodetected outputs from the array of wavelength selective elements before electrically selecting at least one of the photodetected outputs.

5. The method as claimed in claim 1, further comprising: splitting the received optical signal into at least two component signals having orthogonal polarisation states;
   wherein directing at least a part of the optical signal through an array of wavelength selective elements comprises:
   directing a first of the component signals through a first n×m array of wavelength selective elements; and
   directing a second of the component signals through a second n×m array of wavelength selective elements, each of the first and second n×m arrays comprising n parallel groups, each group comprising m coupled wavelength selective elements,
   wherein the first and second n×m arrays of wavelength selective elements comprise at least one group pair, wherein a group pair comprises a group of coupled wavelength selective elements in the first array and a group of coupled wavelength selective elements in the second array which are configured to select the same channel wavelength.

6. The method as claimed in claim 5, further comprising: optically amplifying each of the component signals before directing the components signals through the appropriate n×m array of wavelength selective elements.

7. The method as claimed in claim 5, further comprising: rotating at least one of the component signals such that the component signal is adapted to a propagation mode of a waveguide connecting the array of wavelength selective elements through which the component signal is to be directed.

8. The method as claimed in claim 1, wherein photodetecting outputs from the array of wavelength selective elements comprises, for each group pair:
   converting the optical output of the m coupled wavelength selective elements in the group belonging to the first array and the optical output of the coupled wavelength selective elements in the group belonging to the second array into a single photocurrent by inputting the two optical outputs to a single photodetecting element.

9. An optical filtering module for receiving an optical signal and generating at least one electrical output, the optical filtering module comprising:
   a coupler for receiving the optical signal;
   an n×m array of wavelength selective elements, the n×m array comprising n parallel groups, each group comprising m coupled wavelength selective elements;
   a photodetector unit for photodetecting an output from each of the n groups of coupled wavelength selective elements; and
   an electrical switch for electrically selecting at least one output of the photodetector unit.

10. The optical filtering module as claimed in claim 9, wherein at least some of the wavelength selective elements are configurable to select a specific wavelength from within a selection range.

11. The optical filtering module as claimed in claim 9, wherein the
   photodetector unit comprises n photodetecting elements, each
   photodetecting element arranged to photodetect an output from one of the n groups of wavelength selective elements.

12. The optical filtering module as claimed in claim 9, further comprising:
   an optical amplifier unit for amplifying the received optical signal, wherein the optical amplifier unit comprises a Semiconductor Optical Amplifier (SOA) and wherein the photodetector unit comprises at least one semiconductor photodetector.

13. The optical filtering module as claimed in claim 12, wherein the optical amplifier unit comprises a dedicated optical amplifying element for amplifying each of the component signals.

14. The optical filtering module as claimed in claim 9, further comprising:
   an electrical amplifier unit for amplifying the outputs from the photodetector unit, wherein the electrical amplifier unit comprises at least n electrical amplifying elements, each electrical amplifying element arranged to amplify an output from a photodetecting element.

15. The optical filtering module as claimed in claim 9, further comprising:

a polarisation splitter and rotator for splitting the received optical signal into at least two component signals having orthogonal polarisation states.

16. The optical filtering module as claimed in claim 15, wherein the n×m array of wavelength selective elements comprises a first n×m array of wavelength selective elements;
  wherein the optical filtering module further comprises a second array of n×m wavelength selective elements, each of the first and second arrays comprising n parallel groups, each group comprising m coupled wavelength selective elements,
  wherein the first array of wavelength selective elements is arranged to receive a first component signal of the received optical signal and the second array of wavelength selective elements is arranged to receive a second component signal of the received optical signal, and
  wherein the first and second n×m arrays of wavelength selective elements comprise at least one group pair, wherein a group pair comprises a group of coupled wavelength selective elements in the first array and a group of coupled wavelength selective elements in the second array which are configured to select the same channel wavelength.

17. The optical filtering module as claimed in claim 16, wherein
  the photodetector unit comprises n photodetecting elements, each photodetecting element corresponding to a group pair and arranged to convert the optical outputs of the two groups of coupled wavelength selective elements forming the group pair into a single photocurrent.

18. The optical filtering module as claimed in claim 15, wherein the polarisation splitter and rotator is configured to rotate at least one of the component signals such that the component signal is adapted to a propagation mode of a waveguide connecting the array of wavelength selective elements arranged to receive the component signal.

19. The optical filtering module as claimed in claim 9, wherein at least a coupler for receiving the optical signal, the n×m array of wavelength selective elements, and the photodetector unit are arranged on a single chip.

20. A controller for controlling an optical filtering module, the optical filtering module for receiving an optical signal and generating at least one electrical output, the optical filtering module comprising:
  a coupler for receiving the optical signal;
  an n×m array of wavelength selective elements, the n×m array comprising n parallel groups, each group comprising m coupled wavelength selective elements;
  a photodetector unit for photodetecting an output from each of the n groups of coupled wavelength selective elements; and
  an electrical switch for electrically selecting at least one output of the photodetector unit,
  wherein the controller is operable to configure at least one of:
  a selection wavelength of a wavelength selective element; or the electrical switch.

* * * * *